(12) United States Patent
Wang et al.

(10) Patent No.: US 10,802,113 B2
(45) Date of Patent: Oct. 13, 2020

(54) OPTICAL RANGING DEVICE AND OPTICAL RANGING SYSTEM

(71) Applicant: Benewake (Beijing) Co., Ltd., Beijing (CN)

(72) Inventors: Rui Wang, Beijing (CN); Ting Wang, Beijing (CN); Yuan Li, Beijing (CN); Kai Zheng, Beijing (CN); Da Shu, Beijing (CN)

(73) Assignee: BENEWAKE (BEIJING) CO., LTD., Beijing (CN)

( * ) Notice: Subject to any disclaimer, the term of this patent is extended or adjusted under 35 U.S.C. 154(b) by 367 days.

(21) Appl. No.: 15/744,644

(22) PCT Filed: Oct. 18, 2017

(86) PCT No.: PCT/CN2017/106659
§ 371 (c)(1),
(2) Date: Jan. 12, 2018

(87) PCT Pub. No.: WO2018/184374
PCT Pub. Date: Oct. 11, 2018

(65) Prior Publication Data
US 2019/0004152 A1   Jan. 3, 2019

(30) Foreign Application Priority Data

Apr. 8, 2017   (CN) .......................... 2017 1 0226023
May 4, 2017   (CN) .......................... 2017 1 0307467

(51) Int. Cl.
*G01C 3/08*    (2006.01)
*G01S 7/481*   (2006.01)
(Continued)

(52) U.S. Cl.
CPC ............ *G01S 7/4814* (2013.01); *G01S 7/481* (2013.01); *G01S 7/4813* (2013.01);
(Continued)

(58) Field of Classification Search
CPC ............ G02B 19/0061; G02B 19/0028; G02B 5/208; G01S 17/08; G01S 7/4816;
(Continued)

(56) References Cited

U.S. PATENT DOCUMENTS 3,937,575 A    2/1976  Bateman
2007/0181810 A1*  8/2007  Tan ....................... G01S 7/4811
                                                          250/341.1
(Continued)

FOREIGN PATENT DOCUMENTS

CN    203880609 U   10/2014
CN    106188954 A   12/2016
(Continued)

OTHER PUBLICATIONS

International Search Report and Written Opinion for PCT/CN2017/106659 dated Jan. 16, 2018; 10 pages. (English translation not yet available.).

*Primary Examiner* — Mark Hellner
(74) *Attorney, Agent, or Firm* — Schwabe Williamson & Wyatt, PC

(57) ABSTRACT

The present disclosure relates to an optical ranging device. The optical ranging device comprises a housing, a bottom cover, an emitting lens, a receiving lens and a circuit board. The emitting lens and the receiving lens are fixed on the circuit board. The circuit board comprises a light emitting module, receiving module and data processing and controlling module. An infrared light emitted by a light source of the light emitting module passes through the emitting lens and the housing successively and enters the external environment. The infrared light reflected by the object passes through the housing and the receiving lens successively and is received by the receiving module which is connected to a signal processing and controlling module. The distance (Continued)

between the optical ranging device and the object is calculated based on the Time of Flight principle.

18 Claims, 3 Drawing Sheets

(51) Int. Cl.
  *G02B 19/00* (2006.01)
  *G01S 17/08* (2006.01)
  *G02B 5/20* (2006.01)
(52) U.S. Cl.
  CPC ............ *G01S 7/4816* (2013.01); *G01S 17/08* (2013.01); *G02B 19/0028* (2013.01); *G02B 19/0061* (2013.01); *G02B 5/208* (2013.01)
(58) Field of Classification Search
  CPC ...... G01S 7/022; G01S 7/4813; G01S 7/4814; G01S 7/481

USPC ....................................................... 356/5.01
  See application file for complete search history.

(56) References Cited

U.S. PATENT DOCUMENTS

2014/0071428 A1\* 3/2014 Suzuki ..................... G01C 3/08
 356/4.01
2016/0291136 A1\* 10/2016 Lindskog ................ G01S 17/89

FOREIGN PATENT DOCUMENTS

| CN | 106291574 A | 1/2017 |
| CN | 106872961 A | 6/2017 |
| CN | 106896367 A | 6/2017 |

\* cited by examiner

OPTICAL RANGING DEVICE AND OPTICAL RANGING SYSTEM

CROSS REFERENCE TO RELATED APPLICATIONS

This application a US National Phase application based upon PCT Application Serial No. PCT/CN2017/106659 filed Oct. 18, 2017 which claims the priority of Chinese Patent Application No. 201710307467.4, filed May 4, 2017 and the priority of Chinese Patent Application No. 201710226023.8, filed Apr. 8, 2017; the disclosures of each of which are hereby incorporated by reference in their entirety.

FIELD

The present disclosure relates to the field of an optical ranging device and an optical ranging system.

BACKGROUND

In the conventional technology, triangulation is a process mainly using laser source which emits the probe light to determine the location. However, when triangulation is used, the laser source and the ranging unit need to be set as a support structure with special angle and distance in the same plane. This limits the structure design of the ranging device and leads to a big size of the ranging device.

In order to solve the above problem, the present disclosure discloses an optical ranging device and a ranging system based on Time of Flight (ToF) principle. The optical ranging device using ToF principle is not restricted by the triangular relations of triangulation, therefore having a more flexible structure design.

SUMMARY

The present disclosure provides an optical ranging device, comprising: a housing, a bottom cover, an emitting lens, a receiving lens and a circuit board, wherein the circuit board comprises a light emitting module, a receiving module and a data processing and controlling module;

the circuit board, receiving lens and emitting lens are installed in the space formed by the housing and the bottom cover;

an infrared light emitted by a light source in the light emitting module passes through the emitting lens and the housing successively and enters the external environment;

the infrared light reflected by an object passes through the housing and the receiving lens successively and is received by the receiving module;

the data processing and controlling module is connected to the receiving module; and the distance between the optical ranging device and the object is calculated based on the Time of Flight principle.

The optical ranging device further comprises a seal ring, wherein the seal ring is provided between the housing and the bottom cover.

In an aspect, the seal ring is made from silica gel.

In another aspect, a photoelectric sensor is included in the receiving module and the photoelectric sensor converts light signal into electrical signal.

In another aspect, the emitting lens is fixed on the circuit board and set in the optical path of the infrared light emitted by the light source of the light emitting module.

In another aspect, the receiving lens is fixed on the circuit board and set in the optical path of the infrared light reflected by the object and received by the receiving module.

In another aspect, the receiving lens is an imaging lens, which collects or images the infrared light reflected by the object to the photoelectric sensor in the receiving module.

In another aspect, the optical ranging device has a light source and the light source is a LED light source which emits the infrared light.

In another aspect, the optical ranging device also comprises a receiving optical filter and an emitting optical filter, both of which are provided on the light transmission surface in the front of the housing.

In another aspect, the receiving optical filter is provided at the via hole in the front of the housing. The shape of the receiving optical filter matches with the via hole, forming a sealed structure; the receiving optical filter is provided in the optical path through which the receiving lens receives the infrared light reflected by the object.

In another aspect, the emitting optical filter is provided at the via hole in the front of the housing. The shape of the emitting optical filter matches with the via hole, forming a sealed structure; the emitting optical filter is set in the optical path through which the infrared light from the emitting lens passes.

In another aspect, the emitting optical filter and the receiving optical filter are wavelength-selective optical filters, which allows the transmission of the light that has a wavelength corresponding to the infrared light emitted by the light source of the light emitting module; therein, the emitting optical filter and/or the receiving optical filter are band filter, which allows the transmission of the light that has a wavelength corresponding to the infrared light emitted by the light source of the light emitting module, meanwhile prevents the transmission of the light that has other wavelengths; alternatively, the emitting optical filter and/or the receiving optical filter are high pass filter, which allows the transmission of the light that has a wavelength corresponding to or longer than the infrared light emitted by the light source of the light emitting module, meanwhile prevents the transmission of the light that has other wavelengths; alternatively, the emitting optical filter and/or the receiving optical filter are low pass filter, which allows the transmission of the light that has a wavelength corresponding to or shorter than the infrared light emitted by the light source of the light emitting module, meanwhile prevents the transmission of the light that has other wavelengths.

In another aspect, the emitting lens is a TIR lens and the TIR lens has a light guide structure which is a groove located on the light emitting surface of the TIR lens near the receiving module.

In another aspect, the groove is a straight groove on the light emitting surface of the TIR lens.

In another aspect, the straight groove is perpendicular to the common plane on which the optical axis of receiving visual field of the receiving module and the optical axis of the TIR lens colocate.

In another aspect, the groove is an arc-shaped groove on the light emitting surface of the TIR lens.

In another aspect, the groove has a circular arc shape on the light emitting surface of the TIR lens.

In another aspect, the arc-shaped groove or the circular arc-shaped groove shows geometrically symmetry aspect to the common plane on which the optical axis of the receiving visual field of the receiving module and the optical axis of the TIR lens colocate.

In another aspect, the concave surface of the groove is arc surface, a quarter of a cylindrical surface or oblique plane surface.

In another aspect, the depth of the straight groove decreases along the direction from the center of the TIR lens to the receiving module. One side of the straight groove near the center of the TIR lens has a flat surface, which is perpendicular to the light emitting surface of the TIR lens.

In another aspect, the depth of the arc-shaped groove or the circular arc-shaped groove decreases from the center of the TIR lens along the external direction. One side of the arc-shaped or circular arc-shaped groove near the center of the TIR lens has a flat surface, which is perpendicular to the light emitting surface of the TIR lens.

Further, the housing and/or bottom cover are made from resin composition; the resin composition comprises: 30 to 89 parts by weight of TPX, 1 to 16 parts by weight of nano-barium sulfate and 9 to 36 parts by weight of glass fiber and/or carbon fiber.

The present disclosure also provides a resin composition, comprising: 30 to 89 parts by weight of TPX, 1 to 16 parts by weight of nano-barium sulfate and 9 to 36 parts by weight of glass fiber and/or carbon fiber.

Further, 2 to 11 parts by weight of graphene is included.

Further, 0.5 to 1.5 parts by weight of antioxidant is included; the antioxidant is selected from the group comprising hindered phenolic antioxidant, thioester antioxidant and ester antioxidant, or a mixture thereof.

Further, 0.2 to 1.5 parts by weight of light stabilizer is included.

Further, 1 to 5 parts by weight of pigment is included.

The present disclosure also provides a ranging system. The ranging system comprises a device body and the optical ranging device described in any one of the embodiments above. The optical ranging device is installed on the device body for measuring the distance between the device body and the object.

Further, the device body can be a mobile service robot, cleaning robot or flight vehicle.

Further, the device body is a flight vehicle. The optical ranging device is installed at the bottom of the flight vehicle connected to the flight controlling module of the flight vehicle. The optical ranging device measures the height from itself to the ground and transfers the height data to the flight controlling module of the flight vehicle, which controls the flight altitude of the flight vehicle.

The optical ranging device using ToF principle is not restricted by the triangular relations, thus having a more flexible structure design. Due to the light guide structure set on the TIR lens, the detecting blind zone near the ranging device is reduced efficiently.

DETAILED DESCRIPTION

In order to further understand the present disclosure, the preferred embodiments of the present disclosure are described in conjunction with examples herein. It should be understood that the descriptions are merely to further illustrate the characters and advantages of the present disclosure, rather than limit the claims of the present disclosure.

Figure 1:
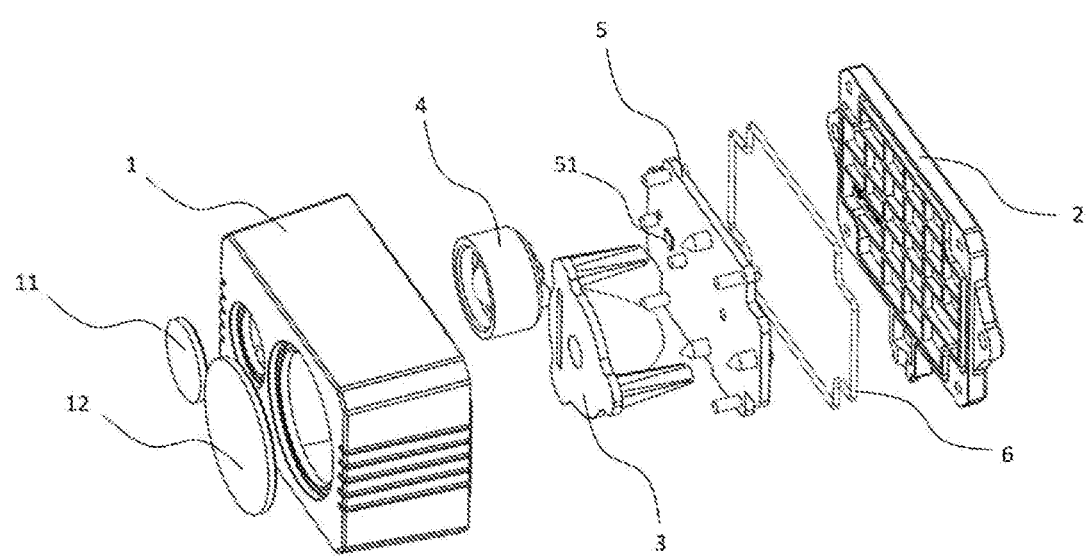
FIG. 1 is the structure representation of the optical ranging device.

The present disclosure provides an optical ranging device. As shown in FIG. 1, the optical ranging device comprises a housing 1, a bottom cover 2, an emitting lens 3, a receiving module 4 and a circuit board 5. Therein, the circuit board comprises a light emitting module, a receiving module and a data processing and controlling module. Therein, the receiving module comprises a photoelectric sensor 51, and the light emitting module comprises a light source. The receiving lens is fixed on the circuit board and set in the optical path through which the photoelectric sensor receives the light. The emitting lens is fixed on the circuit board and set in the optical path through which the emitting module emits the infrared light. The circuit board, receiving lens and emitting lens are installed in the space formed by the housing and the bottom cover. In a preferred embodiment, in order to enhance the sealing performance of the optical ranging device, a seal ring 6 is provided between the housing 1 and the bottom cover 2. In a preferred embodiment, the sealing ring 6 is made from silica gel.

In the optical ranging device, infrared light is emitted by the light emitting module on the circuit board and the light emitting module has a light source. The light source is preferably a laser source or LED light source. In a preferred embodiment, LED light source is preferred in order to avoid the potential hazard caused by laser to eyes.

In order to focus the infrared light emitted by the LED light source and reduce the divergence angle of the infrared light emitted by the LED light source. An emitting lens is provided in the optical path of the infrared light emitted by the LED light source of the emitting module. The emitting lens is fixed on the circuit board. In a preferred embodiment, in order to efficiently focus the light emitted by LED light source in a limited space, the emitting lens is a total internal reflection (TIR) lens 7.

The infrared light focused by the emitting lens passes through the housing 1 and enters into the external surroundings. The infrared light is reflected after encountering an object or obstacle. The infrared light reflected by an object or obstacle (echo) passes through the housing and the receiving lens successively, and then reaches the receiving module on the circuit board. The circuit board further comprises a data processing and controlling module which is connected to the receiving module. The distance between the optical ranging device and the object or obstacle in the surroundings is calculated based on Time of Flight principle. The optical ranging device using ToF principle is not restricted by the triangular relations, therefore having a more flexible structure design.

Therein, the receiving module preferably comprises a photoelectric sensor 51 that receives the infrared light reflected by object. The photoelectric sensor converts the light signal into electrical signal.

Therein, the receiving lens focusses the infrared light reflected by object to the photoelectric sensor. The receiving lens is preferably fixed on the circuit board. In one embodiment, the receiving lens is preferably an imaging lens.

According to the present disclosure, the optical ranging device preferably comprises a receiving optical filter and an emitting optical filter. The receiving optical filter and the emitting optical filter are preferably set on the light transmission surface in the front of the housing. Therein, the receiving optical filter is preferably set in the optical path through which the receiving lens receives the infrared light reflected by objects. The receiving optical filter which matches with the via hole is preferably set at the via hole in the front of the housing, forming a sealed structure. The emitting optical filter is preferably set in the optical path through which the infrared light passes the emitting lens. An via hole is preferably provided on the housing. The emitting optical filter which matches with the via hole is preferably set at the via hole in the front of the housing, forming a sealed structure.

As shown in FIG. 1, two via holes are provided on the emission surface of the infrared light in the front of the housing. Receiving optical filter 11 and emitting optical filter 12 are set at the two via holes respectively. The shapes of receiving optical filter 11 and the emitting optical filter 12 match with the shapes of the via holes, forming a sealed structure. In the example, the wavelength of the light beam is less than or equal to 1200 nm. The emitting optical filter 12 is set at one of the via holes on the light emission surface in the front of the housing and in the optical path through which the infrared light passes the emitting lens 3. The receiving optical filter 11 is set at the other via hole on the light emission surface in the front of the housing and in the optical path through which the receiving lens 4 receives the infrared light reflected by obstacle. The emitting optical filter and the receiving optical filter are wavelength-selective optical filters, which allow the transmission of the light with wavelength corresponding to the infrared light emitted by the LED light source. In one embodiment, the emitting optical filter and/or the receiving optical filter is a band filter, which allows the transmission of the light with wavelength corresponding to the infrared light emitted by the LED light source, meanwhile, prevents the transmission of the light with other wavelengths. In one embodiment, the emitting optical filter and/or the receiving optical filter is high pass filter, which allows the transmission of the light with wavelength corresponding to or longer than the infrared light emitted by the LED light source, meanwhile, prevents the transmission of light with other wavelengths. In one embodiment, the emitting optical filter and/or the receiving optical filter is low pass filter, which allows the transmission of the light with wavelength corresponding to or shorter than the infrared light emitted by the LED light source, meanwhile, prevents the transmission of the light with other wavelengths.

In one embodiment, the housing is designed as an integral part, and the entire housing is made from infrared light wavelength-selective material. In one embodiment, the entire housing allows the transmission of the light with the wavelength corresponding to the infrared detection light emitted by the LED light source, meanwhile, prevents the transmission of the light with other wavelengths from the surroundings. Or the entire housing allows the transmission of the light with the wavelength corresponding to or longer than the infrared detection light emitted by the LED light source, meanwhile, prevents the transmission of the light with a wavelength shorter than the infrared light emitted by the LED light source. Or the entire housing allows the transmission of the light with the wavelength corresponding to or shorter than the infrared detection light emitted by the LED light source, meanwhile, prevents the transmission of the light with a wavelength longer than the infrared light emitted by the LED light source.

In order to prevent the interference from ambient light, the housing is preferably made from opaque materials with via hole on the emitting surface. The infrared light emitted by the light source of the light emitting module passes through the emitting lens and the via hole on the housing to reach the surroundings. The via holes preferably include emitting via hole and receiving via hole. The emitting light filter is set at the emitting via hole, and the receiving light filter is set at the receiving via hole. Due to the opaque material preferably used to make the housing and the design of emitting via hole and receiving via hole, the optical path of the infrared light emitted by the light emitting module and that of the infrared light reflected by the obstacles are separated, avoiding the interference between the emitting infrared light and receiving infrared light.

According to the present disclosure, the housing and/or bottom cover is preferably made from resin composition. The resin composition comprises 30 to 89 parts by weight of TPX, 1 to 16 parts by weight of nano-barium sulfate and 9 to 36 parts by weight of glass fiber and/or carbon fiber.

Therein, the content of TPX is preferably from 32 to 89 parts by weight, more preferably from 40 to 89 parts by weight, more preferably from 40 to 80 parts by weight, more preferably from 50 to 75 parts by weight, even more preferably from 58 to 68 parts by weight.

TPX is 4-methylpentene-1 polymer produced by Mitsui. Chemicals Co., Ltd. Japan. Trade name, TPX; chemical name, Methyl pentene copolymer; abbreviation, PMP; density, from 0.82 to 0.83 g/cm$^3$; water absorbency, 0.01%; melting point, 240° C.; Vicat softening temperature, from 160° C. to 170° C.; shrinkage rate, from 1.5% to 3.0%; light transmittance, from 90% to 92%.

Compared with the materials for injection molding housing or plastic housing, such as PVC, ABS, PP and so on in the prior art, TPX has advantages of high temperature resistance, clear and transparent, high melting point, chemical resistance, acid resistance, alcohol resistance and impact resistance. At high temperature, it has considerably high elongation tensile, impact strength and excellent creep resistance. As there is no polar group in TPX molecule, it has good electric insulation, excellent chemical resistance, acid-base resistance, chemical corrosion resistance, organic solvent resistance, and stress crack resistance, as well as low water absorption, remarkably high tolerance to water and water vapor.

The disadvantage of TPX is due to the structure without polar group, which is suitable for hostile working conditions, for example working conditions that involve the contact of acid, basic or pesticides, and not easy to react with other substances. Also due to the structure without polar group, the formability of TPX is not good in the molding process. As a housing of a device, the strength of the housing made from TPX is not enough and easy-deformed. Also, it has a poor environment resistance and is easy to be oxidized; it is easy to be degraded by the irradiation of the light and becomes yellow after heating.

The content of nano-barium sulfate is preferably from 4 to 12 parts by weight, more preferably from 6 to 12 parts by weight, even more preferably from 6 to 10 parts by weight and most preferably 8 parts by weight. The nano-barium sulfate can be any of the nano-barium sulfate well-known to one of the ordinary skill in the art without any special restriction. The particle size of the nano-barium sulfate in the present disclosure is preferably from 0.1 μm to 0.3 μm.

As the arrangement of the polymer spiral of TPX is quite loose, the density of the crystal is from 0.812 g/cm$^3$ to 0.813 g/cm$^3$. When it is used as the housing material and subjected to fixed die or injection molding, the unstable dimension becomes a common problem. In the composition provided by the present disclosure, the dimensional stability and temperature resistance of TPX material is improved by adding nano-barium sulfate as an inorganic powder filler in the TPX material. Also, compared with TPX material, nano-barium sulfate, as an inorganic powder filler, is also suitable to be used in highly corrosive working environment like acid or basic condition. Due to the special property of TPX material, conventional hardener cannot improve its formability efficiently. After many tests, as a harden filler, nano-barium sulfate improves the stability and temperature resistance of TPX material. At the same time, compared with TPX material, nano-barium sulfate used as inorganic powder filler is also suitable to be used in highly corrosive working environment like acid or basic condition. Due to the special property of TPX material, conventional hardener cannot improve its formability efficiently. After many tests, glass fiber and/or carbon fiber is used as a second filler in TPX material in the present disclosure, which improves the mechanical property of the modified TPX material and compensates for the reduction in the mechanical property of the modified TPX material caused by the addition of inorganic powder filler. The nano-barium sulfate and glass fiber and/or carbon fiber added in the composition cooperate with each other, which not only solves the dimensional stability and temperature resistance of TPX, but also greatly improves the mechanical performance of the composition comparing with a single addition.

The content of the glass fiber and/or carbon fiber is preferably from 10 to 36 parts by weight, more preferably from 15 to 30 parts by weight, even more preferably from 20 to 30 parts by weight and most preferably from 26 to 30 parts by weight. The glass fiber and/or carbon fiber can be any of the glass fibers and/or carbon fibers well-known to one of ordinary skill in the art without any special restriction. In the present disclosure, the length of the glass fiber is preferably from 3 mm to 6 mm, and the diameter of the glass fiber is preferably from 9 μm to 13 μm. The length of the carbon fiber is preferably from 6 mm to 20 mm, and the diameter of the carbon fiber is preferably from 7 μm to 15 μm. Glass fiber and carbon fiber are substitutable, and glass fiber will be catalyzed when the amount reaches 40%, while carbon fiber has a relatively stable property. In course of implementation, the glass fiber or carbon fiber is used alone or as a mixture with certain proportion according to the cost or need of strength. The mass ratio of the glass fiber to carbon fiber is preferably (9 to 36):(1 to 10), more preferably (9 to 30):(1 to 10), more preferably (15 to 25):(5 to 10), even more preferably (20 to 25):(5 to 10), and most preferably 20:10.

In order to meet the requirement of improving mechanical property of the composition, the resin composition preferably comprises 2 to 11 parts by weight of graphene. Graphene is a raw material with excellent strength, flexibility and heat conductivity, which improves the overall performance of the TPX material greatly. The addition of graphene not only enhances the mechanical properties of the composition, but also improves the heat conductivity of the TPX material. The housing made from the composition dissipates heat fast, adapting to the large heat dissipation requirement of the device, ensuring the normal operation of the device and the accuracy of the measure data. In the present disclosure, the content of graphene is preferably from 4 to 10 parts by weight, more preferably from 4 to 8 parts by weight, and even more preferably from 6 to 8 parts by weight.

In order to further improve the antioxidation capacity of TPX and adapt to the working condition with strong light in the outdoor, the composition preferably comprises 0.5 to 1.5 parts by weight of antioxidant. The antioxidant can be any of the antioxidants well-known to one of the skill in the art without any special restriction. In the present disclosure, it is preferably selected from hindered phenolic antioxidant, thioester antioxidant and ester antioxidant, or a mixture thereof.

In order to ensure the stability of performance of the resin composition under strong light, 0.1 to 1.5 parts by weight of light stabilizer is also preferably included, more preferably 0.2 to 1.5 parts by weight, even more preferably 0.5 to 1 parts by weight. The light stabilizer can be any of the light stabilizers well-known to one of ordinary skill in the art without any special restriction. In the present disclosure, it is preferably selected from carbon black, titanium dioxide, phthalocyanine blue and phthalocyanine green, or a mixture thereof.

In order to further meet the requirement of blocking the visible and infrared light, the resin composition preferably comprises 1 to 6 parts by weight of pigment, more preferably from 2 to 5 parts by weight. The pigment can be any of the pigments well-known to one of ordinary skill in the art without any special restriction. Inorganic pigment is preferred in the present disclosure, and more preferably titanium dioxide. The addition of pigment solves the problem of great light transmittance of the TPX material. When the composition is used to make a housing, especially a housing for optical instrument, the receiving optical path and the emitting optical path will not interfere with each other, and the entire housing can filter the visible light and the infrared light. In addition, the dimensional stability of the composition is improved. In specific implementation, the addition of pigment depends on the requirement of light transmittance of the working condition. When the required light transmittance is 90% or more, no pigment is added; when the light shading rate is 90% or more, the pigment is added. As the content of titanium dioxide is pretty low and is mainly used to block the light, the parameters of the composition with or without pigment have no significant differences. The content of the pigment can be adjusted according to the light shading rate to the visible light and the infrared light. The inorganic pigment is preferably to be powder, and the particle size of it is preferably from 15 μm to 25 μm.

According to the present disclosure, the resin composition preferably comprises: 66 parts by weight of TPX, 8 parts by weight of nano-barium sulfate and 26 parts by weight of glass fiber and/or carbon fiber;

or preferably comprises: 62 parts by weight of TPX, 8 parts by weight of nano-barium sulfate, 20 parts by weight of glass fiber and 10 parts by weight of carbon fiber;

or preferably comprises: 64 parts by weight of TPX, 8 parts by weight of nano-barium sulfate, 26 parts by weight of glass fiber and/or carbon fiber and 2 parts by weight of titanium dioxide;

or preferably comprises: 60 parts by weight of TPX, 8 parts by weight of nano-barium sulfate, 26 parts by weight of glass fiber and/or carbon fiber and 6 parts by weight of graphene;

or preferably comprises: 58 parts by weight of TPX, 8 parts by weight of nano-barium sulfate, 26 parts by weight of glass fiber and/or carbon fiber, 6 parts by weight of graphene and 2 parts by weight of titanium dioxide;

or preferably comprises: 64.5 parts by weight of TPX, 8 parts by weight of nano-barium sulfate, 26 parts by weight of glass fiber and/or carbon fiber and 1.5 parts by weight of antioxidant;

or preferably comprises: 63 parts by weight of TPX, 8 parts by weight of nano-barium sulfate, 26 parts by weight of glass fiber and/or carbon fiber, 1 part by weight of antioxidant and 2 parts by weight of titanium dioxide;

or preferably comprises: 58.5 parts by weight of TPX, 8 parts by weight of nano-barium sulfate, 26 parts by weight of glass fiber and/or carbon fiber, 1.5 parts by weight of antioxidant and 6 parts by weight of graphene;

or preferably comprises: 64 parts by weight of TPX, 8 parts by weight of nano-barium sulfate, 26 parts by weight of glass fiber and/or carbon fiber, 1 part by weight of antioxidant and 1 part by weight of light stabilizer;

or preferably comprises: 62 parts by weight of TPX, 8 parts by weight of nano-barium sulfate, 26 parts by weight of glass fiber and/or carbon fiber, 1 part by weight of antioxidant, 2 parts by weight of titanium dioxide and 1 part by weight of light stabilizer; and or preferably comprises: 58 parts by weight of TPX, 8 parts by weight of nano-barium sulfate, 26 parts by weight of glass fiber and/or carbon fiber, 1 part by weight of antioxidant, 1 part by weight of light stabilizer and 6 parts by weight of graphene.

In the resin composition provided by the present disclosure, by adding nano-barium sulfate and glass fiber or carbon fiber, the strength of the material is improved greatly, solving the problem of dimensional stability and improved hardness which cannot achieve by the addition of conventional hardeners such as calcium carbonate. In addition, nano-barium sulfate and glass fiber or carbon fiber cooperate with each other, which not only improves the dimensional stability greatly, but also improves the hardness and strength of the entire material. The addition of titanium dioxide not only satisfies the requirement of light shading rate and the shading requirement of the precise photoelectric equipment, but also further improves the dimensional stability and strength of the composition. The addition of graphene not only enhances the strength of the composition, but also improves the heat conductivity of the whole material.

The present disclosure also provides a method for preparing the housing or bottom cover from the resin composition, comprising: mixing the components, performing extruding granulation and molding to obtain the housing or bottom cover. The duration of mixing is preferably from 5 to 15 minutes. The extruding granulation method can be any of the methods well-known to one of the ordinary skill in the art without special restriction, and double screw extruder is preferred to extrude granules in the present disclosure. The temperature for extruding granulation is preferably from 200° C. to 280° C. After extruding granulation, drying is preferably performed before molding; the temperature for drying is preferably from 90° C. to 120° C., more preferably from 100° C. to 110° C. The duration of drying is preferably from 2 h to 3 h. The molding method can be any of the molding methods well-known to one of the ordinary skill in the art without any special restriction, and injection molding is preferred in the present disclosure. The temperature for the injection molding is preferably from 310° C. to 330° C. The pressure for the injection molding is preferably from 100 MPa to 150 MPa, more preferably 120 MPa to 140 MPa, most preferably 130 MPa.

More preferably, the preparation method is as follows: weighing every component according to a predetermined proportion; mixing and stirring all of the materials in a high-speed mixer for 5 to 15 minutes; performing granulation by a double screw extruder at a temperature from 200° C. to 280° C. The granulated material from the above method is dried in a blast air oven at 100° C. for 2 h to 3 h. The dried granulated material is subjected to an injection molding process on an injection molding machine to obtain the housing or bottom cover.

The resin composition can also be used to prepare housing or bottom cover for pesticide corrosion resistance device.

The circuit board is fixed in the space formed by the housing and the bottom cover. The light emitting module and the receiving module are non-coaxial structure, thus there is a detecting blind zone between the visual field of the receiving module and the infrared light transmitting through the TIR lens. In order to eliminate the detecting blind zone between the light emitting module and the receiving module, the present disclosure also disclosed a TIR lens with a light guide structure; the emitting lens is a TIR lens.

The present disclosure also relates to a TIR lens 7 having a light guide structure. The light guide structure is provided on the light emitting surface 71 of the TIR lens 7. The light guide structure is a groove which is located on the side of the emitting surface 71 of the TIR lens 7 near the receiving module.

Figure 2:
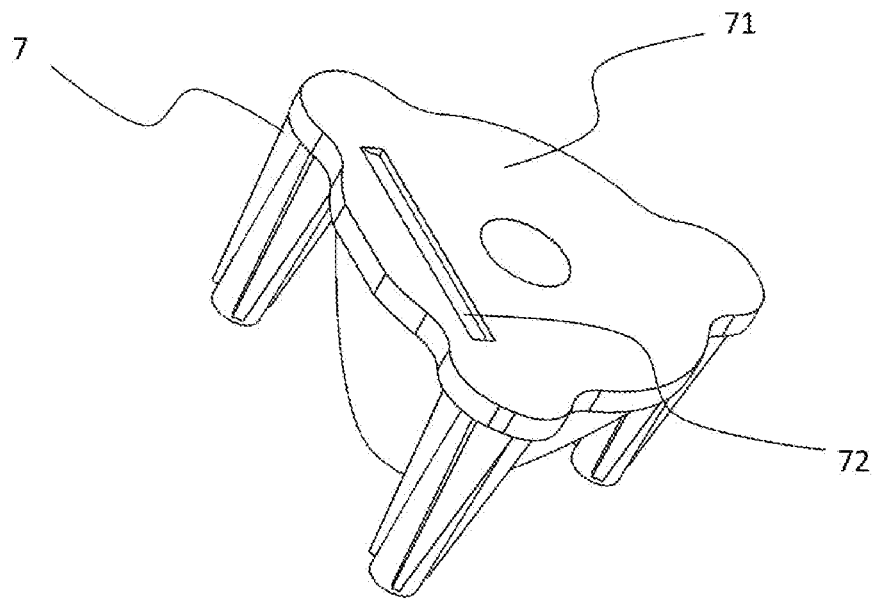
FIG. 2 is the structure representation of the TIR lens in one example.

In one embodiment, as shown in FIG. 2, the groove forms a straight groove 72 on the emitting surface 71 of the TIR lens 7. Preferably, the straight groove 72 is perpendicular to the common plane on which the optical axis of the receiving field of the receiving module and the optical axis of the TIR lens colocate. That is, the receiving field of the receiving module has the first optical axis and the TIR lens has the second axis; the straight groove 72 is preferably perpendicular to the common plane of the first optical axis and the second optical axis.

Figure 3:
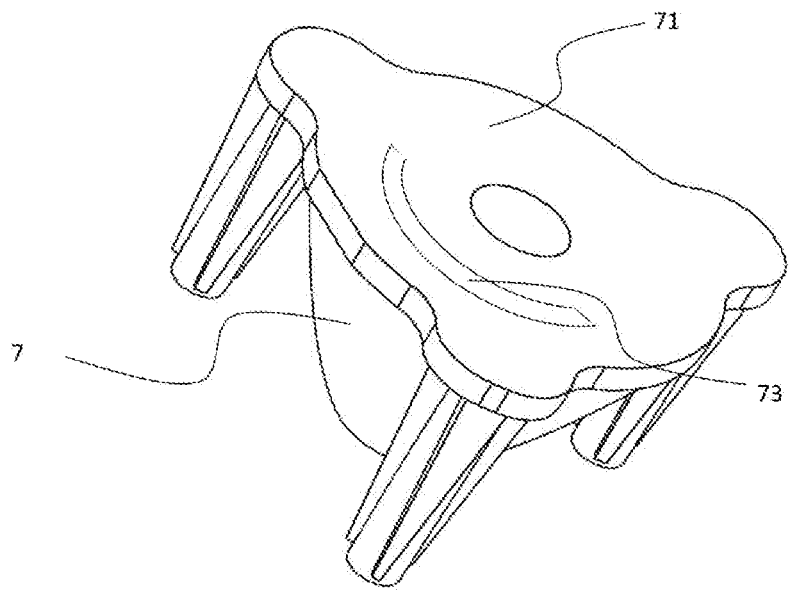
FIG. 3 is the structure representation of the TIR lens in another example.

In one embodiment, as shown in FIG. 3, the groove forms an arc-shaped groove 73 on the light emitting surface 71 of the TIR lens 7. The arc-shaped groove 73 locates on the side of the light emitting surface 71 of the TIR lens 7 near the receiving module. In the preferred embodiment, the arc-shaped groove is a circular arc-shaped groove. Therein, the arc-shaped groove or the circular arc-shaped groove is set near the receiving module. Preferably, the arc-shaped groove and the circular arc-shaped groove are on the light emitting surface of the TIR lens, and are geometrically symmetry to the common plane on which the optical axis of the receiving field of the receiving module and the optical axis of the TIR lens colocate.

Figure 4:
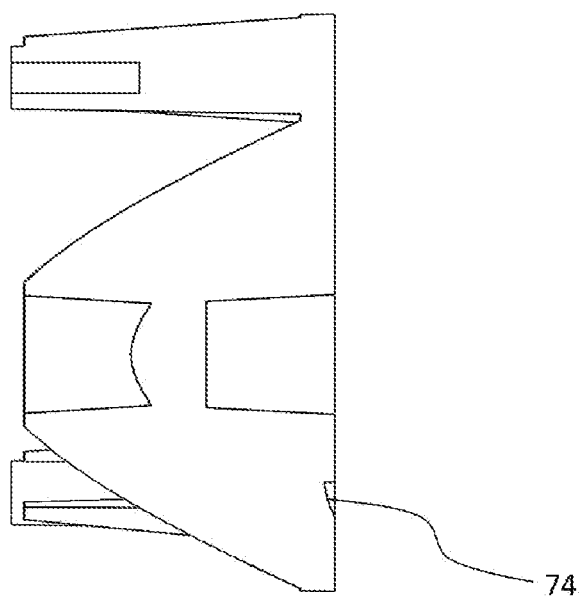
FIG. 4 shows the cross section of the TIR lens in one example.

In any of the embodiments above, as shown in FIG. 4, the groove has a concave surface 74 which is a cambered surface. In one embodiment, the concave surface 74 of the groove is preferably a quarter of the cylindrical surface. In one embodiment, the concave surface of the groove 74 is preferably oblique plane surface.

The side of the groove near the center of the TIR lens is a vertical surface, and the vertical surface is perpendicular to the light emitting surface 71. The depth of the straight groove preferably decreases gradually along the direction from the circular center of the TIR lens to the direction perpendicular to the receiving module. The depth of the arc-shaped or circular arc-shaped groove preferably decreases along the direction from the center of the TIR lens to the outside. That is, the depths of the groove are the same at the position where the radiuses are the same.

In a preferred embodiment, the seal ring 6 is made from silica gel. The silica gel is relatively soft, so that when the bottom cover is fixed to the housing, it will not be deformed due to the unduly hard seal ring.

According to another aspect of the present disclosure, a ranging system is provided, which comprises a device body and the optical ranging device. The ranging device is used to detect the distance between the device body and the object in the surroundings. The device body is preferably a walking robot, cleaning robot, unmanned aerial vehicle or mobile service robot. The optical ranging device is provided on the device body and used for measuring the distance between the outside obstacle and the device body. The optical ranging device can be any of the ranging devices referred in the examples.

In one embodiment, the device body is a flight vehicle and the optical ranging device is installed at the bottom of the flight vehicle to measure the height between the aerial vehicle and the ground. The flight vehicle, for example, is unmanned aerial vehicle, particularly plant protection unmanned aerial vehicle. The optical ranging device is connected with the flight controlling module in the flight vehicle. The optical ranging device measures the height of itself above the ground and transfers the distance data to the flight controlling module of the flight vehicle, and then the flight controlling module controls the flying height of the flight vehicle.

In order to illustrate the present disclosure further, the optical ranging device and the optical ranging system provided in the present disclosure will be described clearly in conjunction with examples.

All the chemical reagents used in the present disclosure are commercially available. In the examples, the particle size of nano-barium sulfate is 0.1 μm; the diameter of glass fiber is 10 μm and the length is 5 mm; the diameter of carbon fiber is 8 μm and the length is 10 mm; the diameter of the titanium dioxide is 0.2 μm; the antioxidant is 1010 and the light stabilizer is carbon black.

EXAMPLES

Example 1

The compositions were divided into Group a and Group A according to the presence of glass fiber or carbon fiber.

Group a has three compositions with three proportions, namely:

Composition $a_0$: 64% by mass percentage of TPX, 8% by mass percentage of nano-barium sulfate, the mass percentage 26% by mass percentage of the glass fiber and 2% by mass percentage of the titanium dioxide;

Composition $a_1$: 89% by mass percentage of TPX, 1% by mass percentage of the nano-barium sulfate, 9% by mass percentage of the glass fiber, and 1% by mass percentage of the titanium dioxide;

Composition $a_2$: 42% by mass percentage of TPX, 16% by mass percentage of the nano-barium sulfate, 36% by mass percentage of the glass fiber and 6% by mass percentage of the titanium dioxide.

Group A has three compositions with three proportions, namely:

Composition $A_0$: 64% by mass percentage of TPX, 8% by mass percentage of the nano-barium sulfate, 26% by mass percentage of the carbon fiber 2% by mass percentage of the titanium dioxide;

Composition $A_1$: 89% by mass percentage of TPX, 1% by mass percentage of the nano-barium sulfate, 9% by mass percentage of the carbon fiber, 1% by mass percentage of the titanium dioxide;

Composition $A_2$: 42% by mass percentage of TPX, 16% by mass percentage of the nano-barium sulfate, 36% by mass percentage of the carbon fiber, 6% by mass percentage of the titanium dioxide.

The properties of the materials prepared from the compositions of Group a and Group A were tested, and the results were shown in Table 1.

TABLE 1

Test results of the properties of the materials prepared from the compositions of Group a and Group A

| Test items | Unit | $a_0$ | $a_1$ | $a_2$ | $A_0$ | $A_1$ | $A_2$ |
|---|---|---|---|---|---|---|---|
| Breaking strength | MPa | 29 | 28.5 | 25 | 33 | 32 | 29 |
| Tensile elastic modulus | MPa | 1950 | 2000 | 1850 | 2100 | 2100 | 1980 |
| Bending strength | MPa | 35 | 36 | 34 | 38 | 39 | 36 |
| Notched impact strength | J/m | 24 | 22 | 21 | 25 | 24.5 | 24 |
| Rockwell hardness | — | 87 | 85 | 87 | 90 | 88 | 89 |
| Light shading ratio | % | 100% | 90% | 100% | 100% | 92% | 100% |

Example 2

The compositions were divided into Group b and Group B according to the presence of glass fiber or carbon fiber.

Group b has three compositions with three proportions, namely:

Composition $b_0$: 58% by mass percentage of TPX, 8% by mass percentage of nano-barium sulfate, 26% by mass percentage of glass fiber, 6% by mass percentage of graphene and 2% by mass percentage of titanium dioxide;

Composition $b_1$: 87% by mass percentage of TPX, 1% by mass percentage of nano-barium sulfate, 9% by mass percentage of glass fiber, 2% by mass percentage of graphene and 1% by mass percentage of titanium dioxide;

Composition $b_2$: 32% by mass percentage of TPX, 16% by mass percentage of nano-barium sulfate, 36% by mass percentage of glass fiber, 11% by mass percentage of graphene and 5% by mass percentage of titanium dioxide.

Group B has three compositions with three proportions, namely:

Composition $B_0$: 58% by mass percentage of TPX, 8% by mass percentage of nano-barium sulfate, 26% by mass percentage of carbon fiber, 6% by mass percentage of graphene and 2% by mass percentage of titanium dioxide;

Composition $B_1$: 87% by mass percentage of TPX, 1% by mass percentage of nano-barium sulfate, 9% by mass percentage of carbon fiber, 2% by mass percentage of graphene and 1% by mass percentage of titanium dioxide;

Composition $B_2$: 32% by mass percentage of TPX, 16% by mass percentage of nano-barium sulfate, 36% by mass percentage of carbon fiber, 11% by mass percentage of graphene and 5% by mass percentage of titanium dioxide.

The properties of the materials prepared from the compositions of Group b and Group B were tested, and the results were shown in Table 2.

TABLE 2

Test results of the properties of the materials prepared from the compositions of Group b and Group B

| Test items | Unit | $b_0$ | $b_1$ | $b_2$ | $B_0$ | $B_1$ | $B_2$ |
|---|---|---|---|---|---|---|---|
| Breaking strength | MPa | 30.5 | 31 | 28 | 34 | 33 | 32 |
| Tensile elastic modulus | MPa | 2100 | 2100 | 1980 | 2261 | 2250 | 2110 |
| Bending strength | MPa | 36.8 | 37 | 35.5 | 40 | 41 | 38 |
| Notched impact strength | J/m | 27 | 27 | 26 | 29 | 29 | 27 |
| Rockwell hardness | — | 89 | 86 | 89 | 90 | 88 | 90 |
| Light shading ratio | % | 100% | 93% | 100% | 100% | 90% | 100% |

Example 3

The compositions were divided into Group c and Group C according to the presence of glass fiber or carbon fiber.

Group c has three compositions with three proportions, namely:

Composition $c_0$: 63% by mass percentage of TPX, 8% by mass percentage of nano-barium sulfate, 26% by mass percentage of glass fiber, 1% by mass percentage of antioxidant and 2% by mass percentage of titanium dioxide;

Composition $c_1$: 61.5% by mass percentage of TPX, 1% by mass percentage of nano-barium sulfate, 36% by mass percentage of glass fiber, 0.5% by mass percentage of antioxidant and 1% by mass percentage of titanium dioxide;

Composition $c_2$: 41.5% by mass percentage of TPX, 16% by mass percentage of nano-barium sulfate, 36% by mass percentage of glass fiber, 1.5% by mass percentage of antioxidant and 5% by mass percentage of titanium dioxide.

Group C has three compositions with three proportions, namely:

Composition $C_0$: 63% by mass percentage of TPX, 8% by mass percentage of nano-barium sulfate, 26% by mass percentage of carbon fiber, 1% by mass percentage of antioxidant and 2% by mass percentage of titanium dioxide;

Composition $C_1$: 61.5% by mass percentage of TPX, 1% by mass percentage of nano-barium sulfate, 36% by mass percentage of carbon fiber, 0.5% by mass percentage of antioxidant and 1% by mass percentage of titanium dioxide;

Composition $C_2$: 41.5% by mass percentage of TPX, 16% by mass percentage of nano-barium sulfate, 36% by mass percentage of carbon fiber, 1.5% by mass percentage of antioxidant and 5% by mass percentage of titanium dioxide.

The properties of the materials prepared from the compositions of Group c and Group C were tested, and the results were shown in Table 3.

TABLE 3

Test results of the properties of the materials prepared from the compositions of Group c and Group C

| Test items | Unit | $c_0$ | $c_1$ | $c_2$ | $C_0$ | $C_1$ | $C_2$ |
|---|---|---|---|---|---|---|---|
| Breaking strength | MPa | 28.5 | 29 | 26 | 32 | 33 | 31 |
| Tensile elastic modulus | MPa | 1910 | 1980 | 1860 | 2100 | 2100 | 1900 |
| Bending strength | MPa | 35 | 35 | 34 | 37.5 | 38 | 35 |
| Notched impact strength | J/m | 24.5 | 23 | 22 | 26 | 25 | 24.5 |
| Rockwell hardness | — | 88 | 85.5 | 88 | 90 | 87 | 89.5 |
| Light shading ratio | % | 100% | 92% | 100% | 100% | 93% | 100% |

Example 4

The compositions were divided into Group d and Group D according to the presence of glass fiber or carbon fiber.

Group d has three compositions with three proportions, namely:

Composition $d_0$: 62% by mass percentage of TPX, 8% by mass percentage of nano-barium sulfate, 26% by mass percentage of glass fiber, 1% by mass percentage of antioxidant, 2% by mass percentage of titanium dioxide and 1% by mass percentage of light stabilizer;

Composition $d_1$: 88.3% by mass percentage of TPX, 1% by mass percentage of nano-barium sulfate, 9% by mass percentage of glass fiber, 0.5% by mass percentage of antioxidant, 1% by mass percentage of titanium dioxide and 0.2% by mass percentage of light stabilizer;

Composition $d_2$: 40% by mass percentage of TPX, 16% by mass percentage of nano-barium sulfate, 36% by mass percentage of glass fiber, 1.5% by mass percentage of antioxidant, 5% by mass percentage of titanium dioxide and 1.5% by mass percentage of light stabilizer.

Group D has three compositions with three proportions, namely:

Composition $D_0$: 62% by mass percentage of TPX, 8% by mass percentage of nano-barium sulfate, 26% by mass percentage of carbon fiber, 1% by mass percentage of antioxidant, 2% by mass percentage of titanium dioxide and 1% by mass percentage of light stabilizer;

Composition $D_1$: 88.3% by mass percentage of TPX, 1% by mass percentage of nano-barium sulfate, 9% by mass percentage of carbon fiber, 0.5% by mass percentage of antioxidant, 1% by mass percentage of titanium dioxide and 0.2% by mass percentage of light stabilizer;

Composition $D_2$: 40% by mass percentage of TPX, 16% by mass percentage of nano-barium sulfate, 36% by mass percentage of carbon fiber, 1.5% by mass percentage of antioxidant, 5% by mass percentage of titanium dioxide and 1.5% by mass percentage of light stabilizer.

The properties of the materials prepared from the compositions of Group d and Group D were tested, and the results were shown in Table 4.

TABLE 4

Test results of the properties of the materials prepared from the compositions of Group d and Group D

| Test items | Unit | $d_0$ | $d_1$ | $d_2$ | $D_0$ | $D_1$ | $D_2$ |
|---|---|---|---|---|---|---|---|
| Breaking strength | MPa | 28.2 | 28.5 | 26 | 33 | 33 | 30 |
| Tensile elastic modulus | MPa | 1950 | 1960 | 1800 | 2060 | 2000 | 1900 |
| Bending strength | MPa | 36 | 36 | 33.6 | 37 | 37 | 35 |
| Notched impact strength | J/m | 25 | 24 | 22 | 26 | 25 | 24 |
| Rockwells hardnes | — | 87.8 | 85 | 87 | 89 | 86 | 89 |
| Light shading ratio | % | 100% | 93% | 100% | 100% | 93% | 100% |

Example 5

On the base of the examples 1 to 4, the present disclosure also provides a housing for device, which is made from the composition referred to any of the examples. In the tests, the housing made from the composition referred to any of the examples showed no corrosion phenomenon after 48 h immerging in geoponic corrosive solvent (1:30) such as deltamethrin, cypermethrin, basic copper sulfate, glyphosate, glufosinate, azoles, hymexazole, phenoxyalkanoic acid, trifluralin and so on.

Under the corrosion of various pesticides, the housing made from the composition in any of the examples showed excellent corrosion resistance. In addition, as a housing for device, it has good elastic tension, bending strength, Rockwell hardness and excellent impact resistance, suitable for the unstable or seriously corrosive working conditions; it even provides reliable protection for the device on flights, ships or vehicles.

In practical use, the preparation methods of the examples 1 to 4 are as follows: weighting every component in a predetermined proportion, mixing and stirring all materials in a high-speed mixer for 5 to 15 minutes and performing granulation by a double screw extruder at 200° C. to 280° C. The particle size is around 3 mm. The granulated material prepared by the methods above is dried in a blast air oven at 100° C. for 2 h to 3 h. Then the dried granulated material is subjected to an injection molding process on an injection molding machine (the temperature for the injection molding is 310° C. to 330° C., the pressure is 130 MPa).

As shown in the above, the parameters in Table 1 to Table 4 show that the addition of nano-barium sulfate and glass fiber or carbon fiber greatly improves the strength of the composition, solving the problem of dimensional stability and hardness which the addition of normal hardeners, for example calcium carbonate type hardener, cannot achieve. At the same time, the interaction between nano-barium sulfate and glass fiber or nano-barium sulfate and carbon fiber not only improves the dimensional stability greatly, but also enhances the hardness and strength of the whole material. In practical use, the carbon fiber material is better than the glass fiber. The addition of titanium dioxide not only satisfies the requirement of light shading rate and the shading requirement of precise electro-optical equipment, but also improves the dimensional stability and strength of the modified TPX material. The addition of graphene, not only improves the strength of the modified TPX material, but also increases the heat conductivity of the whole material.

What is claimed is:

1. An optical ranging device, comprising: a housing, a bottom cover, an emitting lens, a receiving lens and a circuit board; wherein the circuit board comprises a light emitting module, a light receiving module and a data processing and controlling module; the circuit board, the receiving lens and the emitting lens are installed in a space formed by the housing and the bottom cover; a light source in the light emitting module emits an infrared light which passes through the emitting lens and the housing successively and enters external environment; the infrared light reflected by an object passes through the housing and the receiving lens successively and is received by the receiving module; the data processing and controlling module is connected to the receiving module; wherein the emitting lens is a TIR lens and the TIR lens has a light guide structure which is a groove structure locating on the side near the receiving module on the emitting surface of the TIR lens; and the distance between the optical ranging device and the object is calculated based on the Time of Flight principle;

wherein the optical ranging device further comprises a receiving optical filter and an emitting optical filter; the receiving optical filter and the emitting optical filter are provided on the light transmission surface in the front of the housing.

2. The optical ranging device according to claim 1, wherein the receiving optical filter is provided at a via hole in the front of the housing and in the optical path of the receiving lens receiving the infrared light reflected by the object, and the shape of the receiving optical filter matches with the via hole to form a sealed structure; the emitting optical filter is provided at a via hole in the front of the housing and in the optical path of the infrared light passing through the emitting lens, and the shape of the emitting optical filter matches with the via hole to form a sealed structure.

3. The optical ranging device according to claim 1, wherein the emitting optical filter and the receiving optical filter are wavelength-selective optical filters, which allow the transmission of the light having a wavelength corresponding to the infrared light emitted by the light source of the light emitting module; wherein the emitting optical filter and/or the receiving optical filter are band filters, which allow the transmission of the light having a wavelength corresponding to the infrared light emitted by the light source of the light emitting module, meanwhile, prevent the transmission of the light having other wavelengths; alternatively, the emitting optical filter and/or the receiving optical filter are high pass filters, which allow the transmission of the light having a wavelength corresponding to or longer than the infrared light emitted by the light source of the light emitting module, meanwhile, prevent the transmission of the light having other wavelengths; alternatively, the emitting optical filter and/or the receiving optical filter are low pass filters, which allow the transmission of the light having a wavelength corresponding to or shorter than the infrared light emitted by the light source of the light emitting module, meanwhile, prevent the transmission of the light having other wavelengths.

4. The optical ranging device according to claim 1, wherein the groove forms a straight groove on the light emitting surface of the TIR lens.

5. The optical ranging device according to claim 4, wherein the straight groove is perpendicular to the common plane on which the optical axis of receiving visual field of the receiving module and the optical axis of the TIR lens colocate.

6. The optical ranging device according to claim 4, wherein the depth of the straight groove gradually decreases along the direction from the center of the TIR lens to the receiving module; the side near the center of the TIR lens of the straight groove is a vertical surface and the vertical surface is perpendicular to the light emitting surface of the TIR lens.

7. The optical ranging device according to claim 1, wherein the groove forms an arc-shaped groove on the light emitting surface of the TIR lens or the groove forms a circular arc-shaped groove on the light emitting surface of the TIR lens.

8. The optical ranging device according to claim 7, wherein the arc-shaped groove or circular arc-shaped groove is geometrically symmetrical with the common plane on which the optical axis of receiving visual field of the receiving module and the optical axis of the TIR lens colocate.

9. The optical ranging device according to claim 7, wherein the depth of the arc-shaped groove or the circular arc-shaped groove decreases along the direction from the center of the TIR lens to external direction; the side near the center of the TIR lens of the arc-shaped or circular arc-shaped groove is a vertical surface which is perpendicular to the light emitting surface of the TIR lens.

10. The optical ranging device according to claim 1, wherein the concave surface of the groove is selected from arc surface, a quarter of a cylindrical surface and oblique plane surface.

11. The optical ranging device according to claim 1, wherein the housing and/or bottom cover are made from a resin composition; the resin composition comprises: 30 to 89 parts by weight of TPX, 1 to 16 parts by weight of nano-barium sulfate and 9 to 36 parts by weight of glass fiber and/or carbon fiber.

12. The optical ranging device according to claim 11, further comprising 2 to 11 parts by weight of graphene.

13. The optical ranging device according to claim 11, further comprising 0.5 to 1.5 parts by weight of antioxidant; the antioxidant is selected from hindered phenolicantioxidant, thioester antioxidant and ester antioxidant, or a mixture thereof.

14. The optical ranging device according to claim 11, further comprising 0.1 to 1.5 parts by weight of light stabilizer.

15. The optical ranging device according to claim 11, further comprising 1 to 5 parts by weight of pigment.

16. A resin composition, comprising: 30 to 89 parts by weight of TPX, 1 to 16 parts by weight of nano-barium sulfate and 9 to 36 parts by weight of glass fiber and/or carbon fiber.

17. The optical ranging device according to claim 5, wherein the depth of the straight groove gradually decreases along the direction from the center of the TIR lens to the receiving module; the side near the center of the TIR lens of the straight groove is a vertical surface and the vertical surface is perpendicular to the light emitting surface of the TIR lens.

18. The optical ranging device according to claim 8, wherein the depth of the arc-shaped groove or the circular arc-shaped groove decreases along the direction from the center of the TIR lens to external direction; the side near the center of the TIR lens of the arc-shaped or circular arc-shaped groove is a vertical surface which is perpendicular to the light emitting surface of the TIR lens.

* * * * *